(12) United States Patent
Haba et al.

(10) Patent No.: US 10,309,107 B2
(45) Date of Patent: Jun. 4, 2019

(54) COLD ROLLED CHANNEL WITHOUT CLIP

(71) Applicant: Telling Industries, LLC, Willoughby, OH (US)

(72) Inventors: Charles Andrew Haba, Kirtland, OH (US); Stephen Charles Linch, Painesville, OH (US)

(73) Assignee: Telling Industries, LLC, Willoughby, OH (US)

( * ) Notice: Subject to any disclaimer, the term of this patent is extended or adjusted under 35 U.S.C. 154(b) by 0 days.

(21) Appl. No.: 15/987,120

(22) Filed: May 23, 2018

(65) Prior Publication Data

US 2018/0266108 A1    Sep. 20, 2018

Related U.S. Application Data

(60) Provisional application No. 62/643,925, filed on Mar. 16, 2018, provisional application No. 62/644,050, filed on Mar. 16, 2018, provisional application No. 62/645,223, filed on Mar. 20, 2018, provisional application No. 62/662,839, filed on Apr. 26, 2018, provisional application No. 62/663,431, filed on Apr.

(Continued)

(51) Int. Cl.
| | | |
|---|---|---|
| *E04C 3/07* | (2006.01) |
| *E04B 2/58* | (2006.01) |
| *E04B 2/76* | (2006.01) |
| *E04B 2/78* | (2006.01) |
| *E04B 1/41* | (2006.01) |
| *F16B 5/00* | (2006.01) |
| *F16M 13/02* | (2006.01) |
| *E04C 3/32* | (2006.01) |
| *E04C 3/04* | (2006.01) |
| *E04C 3/02* | (2006.01) |
| *E04B 1/38* | (2006.01) |
| *E04B 2/74* | (2006.01) |

(52) U.S. Cl.
CPC ............... *E04C 3/07* (2013.01); *E04B 1/40* (2013.01); *E04B 2/58* (2013.01); *E04B 2/763* (2013.01); *E04B 2/789* (2013.01); *E04C 3/32* (2013.01); *F16B 5/0096* (2013.01); *F16M 13/02* (2013.01); *E04B 2001/405* (2013.01); *E04B 2002/7488* (2013.01); *E04B 2103/06* (2013.01); *E04C 2003/026* (2013.01); *E04C 2003/0473* (2013.01)

(58) Field of Classification Search
CPC .......... E04B 2/58; E04B 2/763; E04B 2/7457; E04B 2/789; E04B 2001/405; E04C 3/07; E04C 2003/0473; E04C 2003/026; E04C 3/32; Y10T 403/7073; Y10T 428/1241
See application file for complete search history.

(56) References Cited

U.S. PATENT DOCUMENTS 3,083,794 A * 4/1963 Stovall, Jr. ................ E04B 2/62
                                                   52/364
3,322,447 A * 5/1967 Biggs ...................... E04B 2/763
                                                  403/252

(Continued)

*Primary Examiner* — Adriana Figueroa
*Assistant Examiner* — Jessie T Fonseca
(74) *Attorney, Agent, or Firm* — Edwin A. Sisson, Attorney at Law, LLC; Edwin A. Sisson; Jeffrey J. Banyas (57) ABSTRACT

A stud bridge member used in the construction industry to span horizontally between studs is disclosed. The stud bridge member has at least one set of notches that engage with the stud and eliminate the use of a stud bridge clip and its associated costs and installation time for that stud.

8 Claims, 7 Drawing Sheets

Related U.S. Application Data

27, 2018, provisional application No. 62/663,481, filed on Apr. 27, 2018.

(56) References Cited

U.S. PATENT DOCUMENTS

| | | | | |
|---|---|---|---|---|
| 3,482,369 A * | 12/1969 | Burke | ................. | E04B 2/763 403/347 |
| 3,778,952 A * | 12/1973 | Soucy | ................. | E04B 2/763 52/667 |
| 4,128,979 A * | 12/1978 | Price | ................. | E04B 2/58 52/241 |
| 4,208,851 A * | 6/1980 | Sauer | ................. | E04B 9/067 403/188 |
| D264,756 S * | 6/1982 | Andersson | ................. | D25/126 |
| 4,858,407 A * | 8/1989 | Smolik | ................. | E04B 2/7457 52/481.1 |
| 5,274,973 A | 1/1994 | Liang | | |
| 5,606,837 A * | 3/1997 | Holizlander | ................. | E04C 3/02 52/639 |
| 5,784,850 A | 7/1998 | Elderson | | |
| 5,797,233 A * | 8/1998 | Hascall | ................. | E04B 2/766 52/481.1 |
| 6,021,618 A | 2/2000 | Elderson | | |
| 6,209,268 B1 * | 4/2001 | Schmidt | ................. | E04B 1/2608 52/665 |
| 6,418,695 B1 * | 7/2002 | Daudet | ................. | E04B 7/022 52/639 |
| 6,701,689 B2 | 3/2004 | diGirolamo | | |
| 6,708,460 B1 | 3/2004 | Elderson | | |
| 6,748,705 B2 * | 6/2004 | Orszulak | ................. | E04B 2/767 52/167.1 |
| 6,920,734 B2 | 7/2005 | Elderson | | |
| 7,168,219 B2 | 1/2007 | Elderson | | |
| 8,011,160 B2 * | 9/2011 | Rice | ................. | E04B 2/763 248/247 |
| D657,891 S * | 4/2012 | Jones | ................. | D25/126 |
| 8,181,419 B1 | 5/2012 | diGirolamo | | |
| 8,205,402 B1 | 6/2012 | diGirolamo et al. | | |
| 9,523,196 B2 | 12/2016 | Rice | | |
| 2002/0059773 A1 * | 5/2002 | Elderson | ................. | E04B 2/58 52/667 |
| 2003/0106280 A1 | 6/2003 | diGirolamo | | |
| 2004/0031224 A1 | 2/2004 | Elderson | | |
| 2004/0237451 A1 | 12/2004 | Elderson | | |
| 2006/0026911 A1 * | 2/2006 | Sutton | ................. | E04B 2/7457 52/169.5 |
| 2010/0101174 A1 * | 4/2010 | Orszulak | ................. | G06F 13/4243 52/687 |
| 2015/0082737 A1 * | 3/2015 | Brady | ................. | E04G 23/0222 52/698 |
| 2017/0191254 A1 * | 7/2017 | Daudet | ................. | E04B 2/763 |

* cited by examiner

COLD ROLLED CHANNEL WITHOUT CLIP

CROSS REFERENCES AND PRIORITIES

This application claims the benefit of priority of U.S. Provisional Application Nos. 62/643,925 filed on 16 Mar. 2018, 62/644,050 filed on 16 Mar. 2018, 62/645,223 filed on 20 Mar. 2018; 62/663,481 filed on 27 Apr. 2018; 62/663,431 filed on 27 Apr. 2018 and 62/662,839 filed on 26 Apr. 2018; the teachings of which are incorporated in their entirety.

BACKGROUND

According to U.S. Pat. No. 6,708,460 (the "460 patent"), [m]etal studs are used to form walls in building structures today, including load bearing walls such as exterior walls, [interior walls] and curtain walls. In a typical installation, the metal studs are secured by screws at their lower ends to a bottom track secured to a floor, and extend at their upper ends into a top track secured to overhead joists which may form the framework for an upper floor. The upper ends of the studs generally also are secured to the top track. Exterior wall materials and/or wall boards or other panels are applied to the sides of the studs to form a closed wall structure."

"The load bearing walls are subject to axial loads (compressive loads on the studs) applied to the studs through the overhead joists, and also may be subject to transverse loads (for example, exterior walls may be subject to transverse loads from wind effects) and lateral loads acting in the plane of the wall. These loads may cause flexing (including bowing, twisting or other deformation of the stud) or turning of the metal studs which may cause the [Gypsum in the] walls to crack or otherwise be flawed or damaged. In load bearing walls, this problem is structural as well as aesthetic."

"Bridging systems heretofore have been used to reinforce the metal stud walls by adding structural support between adjacent studs. Three known bridging systems include braced channel, welded channel, and block-and-strap bridging systems."

"In the braced channel bridging system, a U-shape channel spans two or more metal studs, extending through a conduit hole in the web of each stud. An angled brace is fastened to both the channel and the web of the stud, generally with screws or rivets."

"The welded channel bridging system also uses a U-shape channel which spans two or more metal studs and extends through conduit holes in the webs of the studs. The channel is then welded to the studs on one or both sides of the channel."

"In the block-and-strap bridging system, sheet metal "blocks" are fastened between adjacent studs through bent tabs at their distal ends. Then a strap is fastened to one or both sides of two or more metal studs as well as to the respective side or sides of the blocks. Thus the studs are interconnected by the blocks between the studs as well as the straps along the sides of the studs, and the blocks and straps also are connected to each other."

"The installation of metal stud wall systems, including the reinforcing bridging systems, heretofore has been a time consuming process. In a typical installation where the metal studs are fastened at their upper ends to a top track or channel, the attachment positions of the studs are marked off along the top track. Then each stud is fastened to each flange of the top track by screws. A ladder or a scaffold may be required if the top track is too high for the installer to reach. If a ladder is used, the installer climbs the ladder and fastens as many studs as he can reach to the near flange of the top track. Then he must climb down the ladder, move the ladder along the wall so that when he again climbs the ladder he can reach the next one or more studs for fastening to the top track. If a scaffold is used, much more time is expended setting up the scaffold. After doing this along one side of the wall, the process is repeated on the other side of the wall to fasten the studs to the other flange of the top track."

"The metal studs must then be fastened at their lower ends to a bottom track or channel. Each stud must be carefully aligned and squared before being fastened to the bottom track. In addition, the bridging members described above also must be installed to interconnect the metal studs at one or more points between the top and bottom tracks. Because of the time consuming nature of the installation process, fasteners can be missed or forgotten. In the welded channel bridging systems, welders and their equipment are relatively expensive, and welds also can be missed, or can be improperly formed. Defects in welds can be particularly difficult to detect."

"In addition, once the studs are installed, other trades people, such as plumbers and electricians, may remove the bridging members between two studs to give them more room to work, running plumbing lines or electrical lines, for example. If the bridging member is not replaced, the strength of the wall may be reduced."

The invention described in the '460 patent attempts to solve the problems by providing "a stud bridging/spacing member includes an elongate member having at least three longitudinally spaced apart notches for receiving and engaging therein a web of a metal stud. The notches extend at an incline to the longitudinal axis of the elongate member to accommodate different gauges of metal studs while maintaining on-center spacing of studs when assembled in a stud wall."

According to one embodiment of the invention in the '460 patent, "the notches extend inwardly at an angle of about two to about fifteen degrees relative to a perpendicular to the longitudinal axis, and more preferably about five and a half degrees to about eight degrees, and most preferably about seven degrees. The notches have a width of about 0.050 inch (about 0.13 cm) to about 0.1 inch (about 0.2 cm), more preferably about 0.065 inch (about 0.16 cm) to about 0.080 inch (about 0.20 cm), and most preferably about 0.080 inch (about 0.20 cm). The elongate member is formed of fourteen, sixteen or eighteen gauge metal (more preferably steel and most preferably galvanized steel)."

The '460 patent continues with "[t]he at least three notches generally extend laterally inwardly from laterally outer edges of the elongate member. The elongate member may include a fourth notch equally spaced between at least two of the at least three notches. Each of the at least three notches in one portion of the elongate member may be laterally aligned with a corresponding notch in another portion of the elongate member, and/or the laterally aligned notches may incline in the same direction. The sides of the notches generally are parallel, and straight."

"Further in accordance with an embodiment of the invention [disclosed in the '460 patent], the elongate member has a V-shape lateral cross-section formed by longitudinally extending planar first and second portions joined at respective longitudinal edges to form the sides and vertex of the V-shape. The elongate member further may include a pair of wing portions extending laterally outwardly from respective distal ends of the V-shape elongate member. The wing portions may extend in opposite directions from the V-shape elongate member, and each wing portion may extend a distance which is approximately one-third the width of the widest part of the V-shape elongate member. The angle of the V is at least about 90°, more preferably at least about 120° and most preferably about 130°. A shallow angle increases the transverse stiffness of the elongate member, although other means may be used for this purpose."

"In assembling a metal stud wall including a row of metal studs each having at least two flanges interconnected by a web, each stud is fastened at a lower end to a base track. A stud bridging/spacing member is inserted through aligned openings in at least three metal studs, and longitudinally spaced apart notches in the stud bridging/spacing member are engaged with respective webs of the metal studs, thereby establishing and maintaining a fixed spacing between the metal studs and reinforcing the studs against deflection and turning under loading. When the notches engage the webs of the studs, a portion of the webs of the studs generally is caused to bend (at least under load conditions) in the direction of the inclines of the notches to retain the web in the engaged notch. The assembly method may also include securing a top end of each of the studs to a ceiling track."

Review of the '460 patent, particularly FIGS. 4 and 10, shows the channel side of the bridge member pointing down, and the crease of the V on the outer channel side. There is no ability for this device to also function as a channel for mounting wiring and cabling.

SUMMARY

Disclosed herein is a stud bridge member which may comprise a web, a first flange, and a second flange. The web may have a web outer side, a web inner side, a web first edge, and a web second edge defining a web plane having a longitudinal axis. The first flange and the second flange may extend into a space on the web inner side. The stud bridge member may also comprise at least one notch set comprising a first notch and a second notch.

The first flange may comprise a first flange first edge and a first flange second edge defining a first flange plane. The first flange first edge may be joined with the web first edge at a first juncture having a first juncture outside angle ($\Theta_{M1}$) from the web outer side to the first flange, with a corresponding explementary inner angle ($\alpha_{M1}$). The first juncture may form a first juncture line (520) which may be substantially parallel to the longitudinal axis.

The second flange may comprise a second flange first edge and a second flange second edge defining a second flange plane. The second flange first edge may be joined with the web second edge at a second juncture having a second juncture outside angle ($\Theta_{M2}$) from the web outer side to the second flange, with a corresponding explementary inner angle ($\alpha_{M2}$). The second juncture may form a second juncture line which may be substantially parallel to the longitudinal axis.

The first juncture line, the first flange first edge, the first flange second edge, the second juncture line, the second flange first edge, and the second flange second edge may be substantially parallel with the longitudinal axis.

The first notch may comprise a first notch length, a first notch width measured perpendicular to the first notch length, and a first notch cut plane. The first notch length may begin in the first flange at a first flange notch point and may extend at least through the first juncture and to a web first notch point.

The second notch may comprise a second notch length, a second notch width measured perpendicular to the second notch length, and a second notch cut plane. The second notch length may begin in the second flange at a second flange notch point and may extend through at least the second juncture to a web second notch point.

There may be a line passing from the web first notch point to the web second notch point which may be perpendicular to the longitudinal axis.

The first notch width may be substantially perpendicular to and along the first notch length and may increase beginning from the first flange notch point to a first notch inflection line and then may decrease beginning from the first notch inflection line to the web first notch point. The second notch width may be substantially perpendicular to and along the second notch length and may increase beginning from the second flange notch point to a second notch inflection line and then may decrease beginning from the second notch inflection line to the web second notch point.

The notch plane defined by the line connecting the first flange notch point to the web first notch point to the web second notch point to the second flange notch point may not be substantially perpendicular to the longitudinal axis. The notch plane defined by the line connecting the first flange notch point to the web first notch point to the web second notch point to the second flange notch point may be substantially perpendicular to the longitudinal axis.

The first flange notch point and the second flange notch point may be equidistant from the longitudinal axis.

At least one of $\Theta_{M1}$ or $\Theta_{M2}$ may have a value of greater than 270° and less than 360°. Both $\Theta_{M1}$ and $\Theta_{M2}$ may have a value of greater than 270° and less than 360°. $\Theta_{M1}$ and $\Theta_{M2}$ may have substantially the same value.

At least the first notch length may not extend completely across the first flange or the second notch length may not extend completely across the second flange. The first notch length may not extend completely across the first flange and the second notch length may not extend completely across the corresponding second flange.

The first notch and the second notch may be substantially symmetrical.

DETAILED DESCRIPTION

This invention is to an improved stud bridge member. The specification is best understood referring to FIG. 1, which is a detailed drawing of the invented stud bridge member installed to bridge across two studs. Reference will now be made to the various Figures in which, unless otherwise noted, like numbers refer to like structures. As described herein and in the claims, the following numbers refer to the following structures as noted in the Figures.

100 refers to the stud bridge member.
200 refers to the web.
210 refers to the web first edge.
220 refers to the web second edge.
240 refers to the web outer side.
250 refers to the web plane on the outer side.
260 refers to the web inner side.
300 refers to the first flange.
320 refers to the first flange first edge.
340 refers to the first flange second edge.
350 refers to the first flange plane.
400 refers to the second flange.
420 refers to the second flange first edge.
440 refers to the second flange second edge.
450 refers to the second flange plane.
500 refers to the longitudinal axis.
510 refers to the first juncture.
520 refers to the first juncture line.
530 refers to the second juncture.
540 refers to the second juncture line.
600 refers to the first notch of a notch set.
620 refers to the first notch length.
630 refers to the first notch cut length and the first notch cut plane.
640 refers to the first notch width.
660 refers to the web first notch point.
680 refers to the first flange notch point.
690 refers to the first inflection line.
700 refers to the second notch of a notch set.
720 refers to the second notch length.
730 refers to the first notch cut length and the first notch cut plane.
740 refers to the second notch width.
760 refers to the web second notch point.
780 refers to the second flange notch point.
790 refers to the second inflection line.
800 refers to the stud.
810 refers to the hole passing through the web of the stud.
820 refers to the hole depth.
830 refers to the hole length.
$\Theta_{M1}$ refers to the first juncture outside angle.
$\alpha_{M1}$ refers to the first inner angle.
$\Theta_{M2}$ refers to the second juncture outside angle.
$\alpha_{M2}$ refers to the second inner angle.

As described in the background section, the traditional method of installing stud bridge members is to lay the stud bridge member at a hole through the stud, and then use clips on either side to secure the stud bridge member to the stud.

Advances were made to also provide stud bridge members with slots. As indicated in the background section these slots pass through the flanges of the stud bridge member. The stud bridge member is used with the channel, trough, or inner side facing down, making the stud bridge unsuitable for laying cable or wiring.

The novel stud bridge member in this specification can be installed without using a clip at each stud, thus reducing the cost and time to install. As the clips are only used at the end of each stud bridge member, a stud bridge member spanning 3 studs and clipped to 2 other studs would eliminate the time and expense of using 3 clips.

This novel stud bridge member is also installed so that the channel faces up, allowing the channel to be used for cabling or electrical lines.

Additionally, as the stud bridge member places a single horizontal metal channel across the stud and in between the studs, the stud bridge is much stronger and not susceptible to bending as seen in the commonly used V-bridging member described in U.S. Pat. No. 6,708,460.

As the novel stud bridge member uses notches, water gathered during construction is naturally drained out of the upward facing channel through the notches.

This specification uses the term web to describe a middle planar component (200) and the term flange to describe the outer planar components (300 and 400). These terms are interchangeable.

Figure 1:
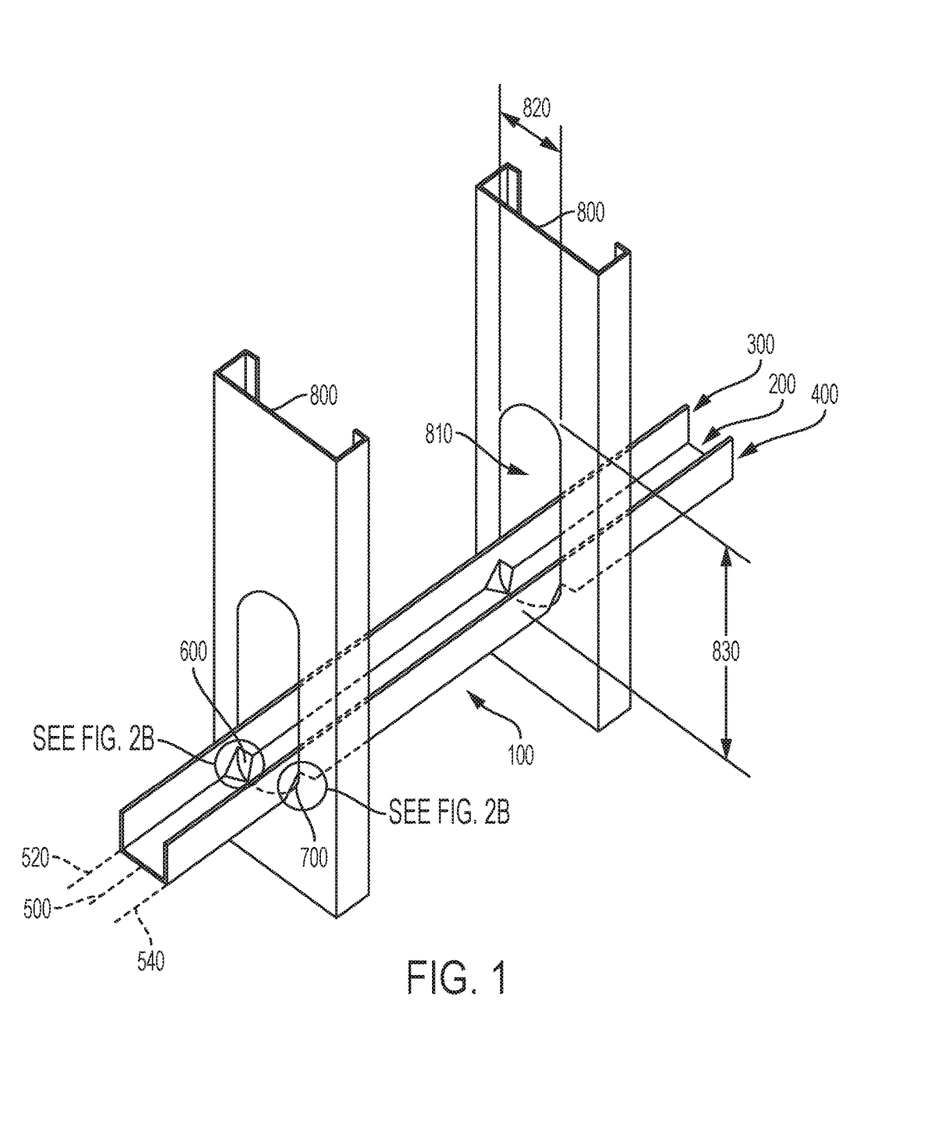
FIG. 1 depicts one embodiment of a stud bridge member as it is installed to bridge across two studs.

The invented stud bridge member is best described by starting with FIG. 1. As shown in FIG. 1, the stud bridge member (100) is used between two studs (800). The stud bridge member has a first flange (300), a web (200), and a second flange (400).

Figure 4:
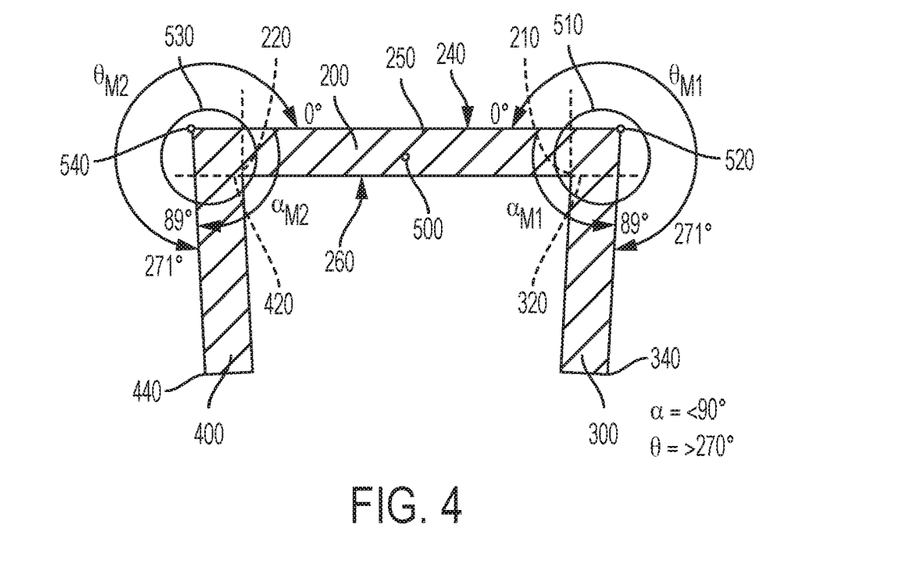
FIG. 4 is a cut-a-way center view at the point noted in FIG. 3A.

In FIG. 1, the web is joined to the first and second flanges forming a juncture line for each juncture. The first juncture line (520) is formed by the juncture (510) of the web (200) and the first flange (300). The second juncture line (540) is formed by the juncture (530) of the web (200) and the second flange (400). Reference is made to FIG. 4 for the juncture annotations (510 and 530) with each juncture defined by the dashed lines, a web portion and a portion of the corresponding flange.

Either or both of the first juncture (510) and the second juncture (530) could be a weld, a bend, glue, or any another means known where two components can be joined. The first juncture and the second juncture are not required to use the same means of joining two components together. For instance, the first juncture may be a weld while the second juncture is a bend. Preferably the stud bridge (100) is made of a unitary piece of construction and the junctures are bends of the same piece, preferably made of metal. Examples of such metals include steel, stainless steel, iron, aluminum, copper, brass, titanium, and the like. However, the stud bridge could alternatively be extruded through a die where it is formed into shape and could be made of a metal or plastic material.

As shown in FIG. 1, stud bridge member (100) has a longitudinal axis (500). This longitudinal axis (500) is used to orient the location of other components of the stud bridge member. The longitudinal axis is at the middle of the web (200) and runs along the web length.

The longitudinal axis (500), the first juncture line (520) and the second juncture line (540) are all preferably parallel with or substantially parallel with each other.

The stud bridge member (100) will have at least one notch set, comprised of a first notch and a second notch. As noted in FIG. 1, the notch set comprises the first notch (600) and the second notch (700). As discussed later, the notches are preferably cut to create a pinch point in the flanges to frictionally engage with the stud (800).

Figure 2A:
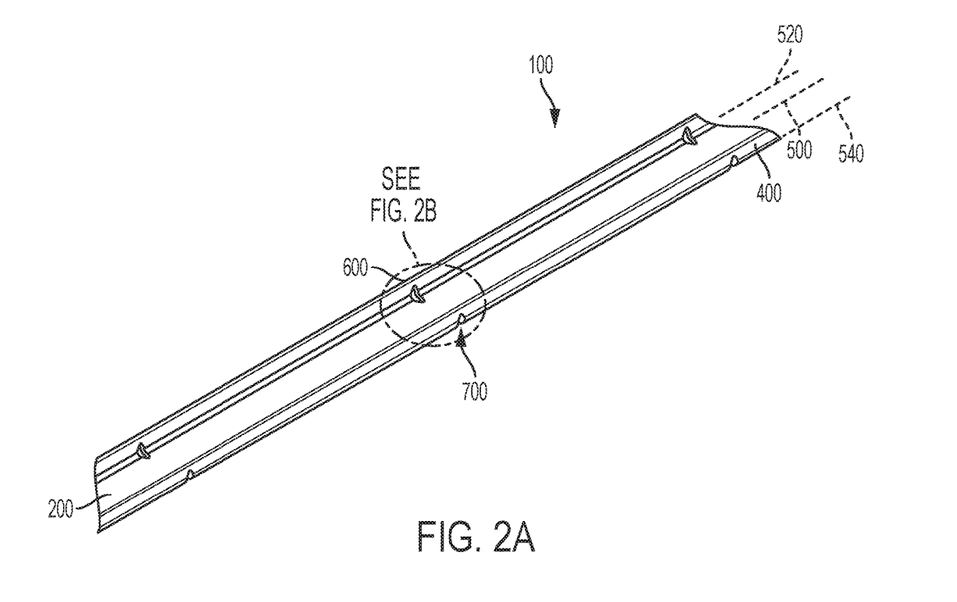
FIG. 2A depicts a perspective inner view of a stud bridge member highlighting the notch set in the circle.

The detail of one notch embodiment is shown beginning with FIG. 2A. FIG. 2A depicts stud bridge member (100) without the stud. As seen, it has the web (200), and the second flange (400). The first flange is also shown, but it is not marked. Also shown are the first juncture line (520), the second juncture line (540) and the longitudinal axis (500). The notch set comprised of first notch (600) and second notch (700) is indicated by the circle referring the reader to FIG. 2B. As indicated, depending upon the length of the stud bridge member, there can be several notch sets. In fact, it may be that not all notch sets are engaged with a stud. For example, there may be notch sets cut every 6 inches, but only every third notch set is engaged if the studs are 18 inches apart.

Figure 2B:
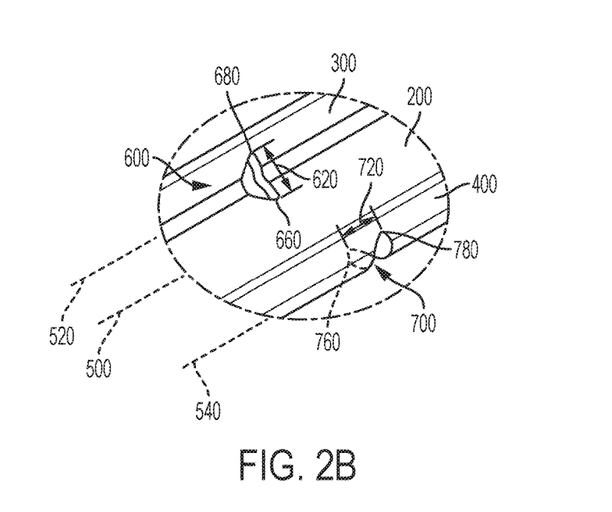
FIG. 2B depicts a close-up perspective inner view of the notch set and the two notches noted in FIG. 2A.

FIG. 2B depicts an inner view of the stud bridge member forming the trough or channel. The web (200), the first flange (300), and the second flange (400) are shown.

In one embodiment, each notch is an opening passing through the outer side to the inner, or channel side, of one of the flanges, the corresponding juncture and the web. The invention is best understood using the preceding notch description.

There are other embodiments. One alternative embodiment comprises a notch which is an opening passing through the outer side to the inner, or channel side, of one of the flanges, through the corresponding juncture and only slightly into the web. Another alternative embodiment is a notch passing through one of the flanges, and the corresponding juncture, but not into the web.

Starting with the first notch (600), the first notch has a first notch length (620). The first notch length is the line running from a reference point called the first flange notch point (680) to the web first notch point (660). In this case, the first notch is an opening starting at the first flange notch point. The first notch runs from the first flange notch point to the web first notch point.

Although not required to be symmetrical with the first notch (600), the second notch (700) can have the same analogous features. The second notch (700) has a second notch length (720). The second notch length is the line running from a reference point called the second flange notch point (780) to the web second notch point (760). In this case, the second notch is an opening starting at the second flange notch point. The second notch runs from the second flange notch point to the web second notch point.

In the case where a notch—either the first notch of the second notch—passes through the juncture, but does not pass into the web, the web notch point is at the web edge where the juncture begins.

Preferably, the notch does not extend across the entire flange. However, in some embodiments, it is possible for a notch to run across the entire flange. In some embodiments, one notch of the notch set may extend across the entire flange, while the other notch does not. In some embodiments, both notches extend across the entirety of their respective flanges. Preferably, both notches do not extend across the entirety of their respective flanges.

Figure 3A:
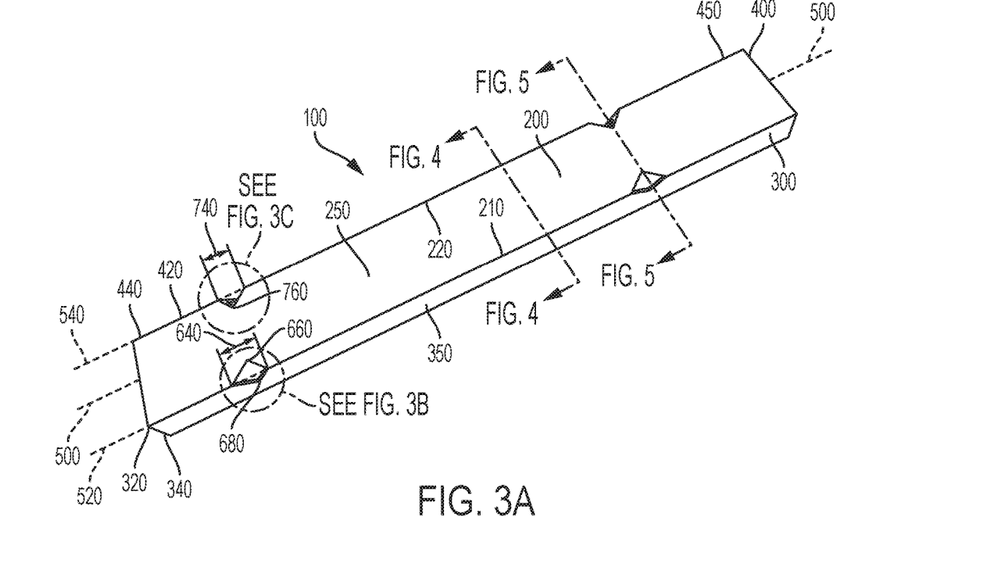
FIG. 3A depicts a perspective outer view of a stud bridge member.

FIG. 3A shows the stud bridge from the outer channel view, or outer side, where the channel is pointing away from the viewer. As shown in FIG. 3A the web (200) has a web first edge (210) and a web second edge (220) which define a web plane (250). While the term web plane refers to a plane, it does not mean that the web is flat. As an example, the web may contain reinforcing ridges running in any direction, such as perpendicular to the longitudinal axis, or parallel with the longitudinal axis.

FIG. 3A also shows the first flange (300) having two first flange plane edges (320 and 340) defining a first flange plane (350). While the term first flange plane refers to a plane, it does not mean that the first flange is flat. As an example, the first flange may contain reinforcing ridges running in any direction, such as perpendicular to the longitudinal axis, or parallel with the longitudinal axis.

FIG. 3A also shows the second flange (400) having two second flange plane edges (420 and 440) defining a second flange plane (450). While the term second flange plane refers to a plane, it does not mean that the second flange is flat. As an example, the second flange may contain reinforcing ridges running in any direction, such as perpendicular to the longitudinal axis, or parallel with the longitudinal axis.

As can be seen, the first flange plane (350), the web plane (250), and the second flange plane (450) are substantially parallel with the longitudinal axis (500).

Figure 3B:
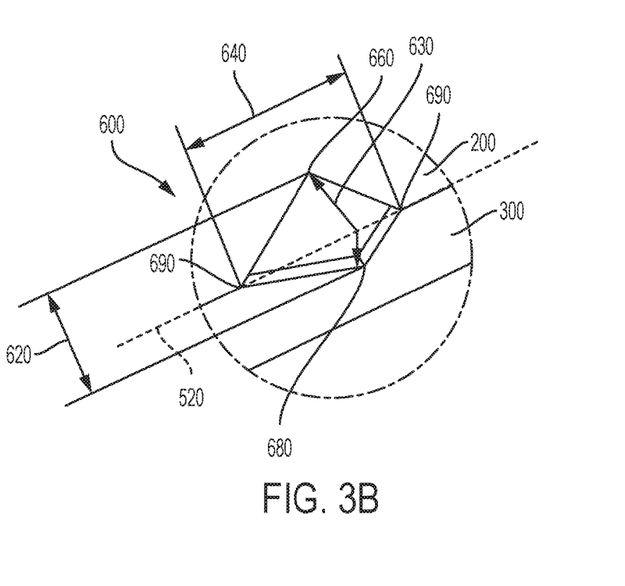
FIG. 3B depicts a close-up perspective outer view of one notch of the notch set noted in FIG. 3A.
Figure 3C:
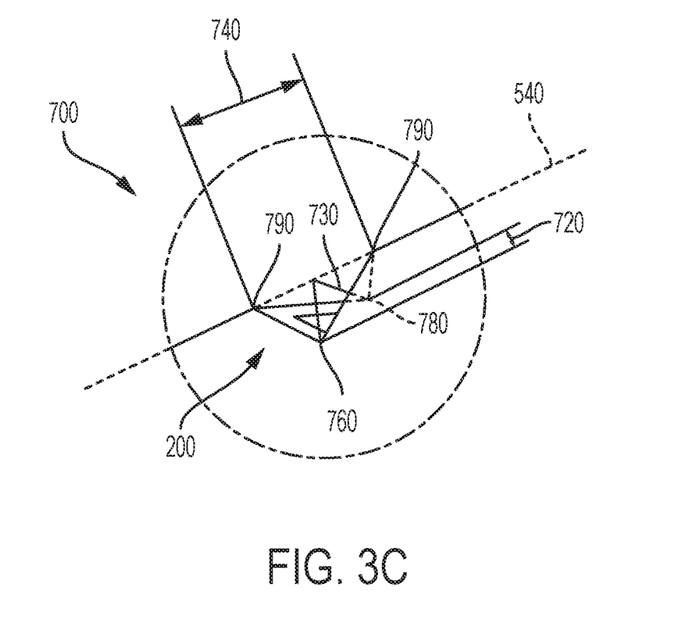
FIG. 3C depicts a close-up perspective inner view of the other notch of the notch set noted in FIG. 3A.

FIG. 3A again highlights the notch set, pointing the viewer to FIG. 3B and FIG. 3C for an expanded view of the first notch (600) and the second notch (700), respectively.

From the outer view, FIG. 3B shows that the first notch (600) has a first notch width (640) which is measured perpendicular to the first notch length (620). The first notch width can be constant along the distance of the notch length or it can have a variable width.

A preferable embodiment is depicted in FIG. 3B, showing a variable notch width increasing as the notch progresses from the first flange notch point (680) across a portion of the first flange (300), across the first juncture line (520), and then decreasing as the notch approaches the web first notch point (660).

The first notch cut plane (630) is defined by a cut made into the web and the first flange if the web and the first flange had been flat, or not bent, when the cut for the first notch was made. After bending, the cut in the web and the first flange form two legs of a triangle, which define the first notch cut plane.

In the current embodiment, there is a first inflection line (690) which is the line perpendicular to the first notch length at which the first notch width (640) is at its greatest value. Because of the rectangular nature of this particular embodiment, the first inflection line coincides with, or is parallel with, the first juncture line (520).

Analogously, FIG. 3C shows the second notch (700) having a second notch width (740) which is measured perpendicular to the second notch length (720). The notch width can be constant along the distance of the notch length or it can have variable widths. A preferable case is depicted in FIG. 3C, showing a variable notch width increasing as the notch progresses from the second flange notch point (780) across a portion of the second flange (400), across the second juncture line (540), and then decreasing as the notch approaches the web second notch point (760).

The second notch cut plane (730) is defined by a cut made into the web and the second flange as if the web and the second flange had been flat, or not bent, when the cut for the second notch was made. After bending, the cut in the web member and the second flange form two legs of a triangle, which define the second notch cut plane.

In the current embodiment, there is a second inflection line (790) which is the line perpendicular to the second notch length at which the second notch width (740) is at its maximum. Because of the rectangular nature of this embodiment, the second inflection line coincides with, or is parallel with, the second juncture line (540).

To facilitate straight positioning of the stud bridge member between the studs, it is preferable that the first notch length (620) and the second notch length (720) not be parallel, but in the same plane.

In a further embodiment the first notch length (620) and the second notch length (720) in a given notch set are perpendicular to the longitudinal axis.

The notches may widen and then shrink to facilitate twisting the member into place and locking it onto the stud. This can be described as the first notch width (640) increasing along the first notch length (620) beginning from the first flange notch point (680) to the first notch inflection line (690) and then decreasing from the first notch inflection line (690) to the web first notch point (660). The notches widen to help account for build variation that occurs during stud to track to building assembly.

Similarly, the second notch width (740) increases along the first notch length (720) beginning from the second flange notch point (780) to the second notch inflection line (690) and then decreases from the first notch inflection line (690) to the web second notch point (760).

The first notch cut plane (630) and the second notch cut plane (730) form what is called the notch plane. The notch plane is also defined by the line connecting the first flange notch point (680) to the web first notch point (660) to the web second notch point (760) to the second flange notch point (780). It is preferable that the line passing from the web first notch point (660) to the web second notch point (760) be perpendicular to the longitudinal axis (500) in order to keep the notches properly aligned with the longitudinal axis.

The notch plane may be perpendicular to, substantially perpendicular to, or not substantially perpendicular to, the longitudinal axis (500).

The only force needed to engage the notches with a stud when the notch plane is substantially perpendicular to the longitudinal axis (500) is a force in the inner direction to engage the notches with a stud.

In contrast, the installer slides the bridge in the longitudinal directional and pushes the bridge member in the inner channel direction to engage the notches with the stud when the notch plane is not substantially perpendicular to the longitudinal axis (500).

The notch sets are parallel when a plurality of notch sets is present on the bridge member.

It is also preferable that the notch points in the flange edges, i.e. the first flange notch point and the second flange notch point, are equidistant from the longitudinal axis.

However, in an alternative embodiment, the notch points in the flange edges, i.e. the first flange notch point and the second flange notch point, may not be equidistant from the longitudinal axis.

In one embodiment both notches in the notch set are symmetrical, i.e. the same geometric shape. In an alternative embodiment, the notches in the notch set are not symmetrical.

FIG. 4 is a cutaway view as depicted in FIG. 3A. Shown in FIG. 4 are a web outer side (240), and a web inner or channel side (260) which is opposite of the web outer side. As further seen, one of the first flange edges (320) is joined with the web first edge (210). As shown, this joining is done at a first juncture (510) having a first juncture outside angle ($\Theta_{M1}$) measured from the web outer side (240) to the outer side of the first flange (300).

The value of $\Theta_{M1}$ is preferably greater than 270° and less than 360°. If $\Theta_{M1}$ is less than 270° the stud bridge member is difficult to rotate onto the walls of the stud hole.

As a corollary, there will be an explementary angle $\alpha_{M1}$, which is the value of the angle opposing angle $\Theta_{M1}$. $\Theta_{M1}$ plus $\alpha_{M1}$ will equal 360°.

The first juncture (510) of the stud bridge forms a first juncture line (520) which is substantially parallel to the longitudinal axis (500).

The similar structure is true of the second flange. As with the first flange, one of the second flange edges (420) is joined with the web second edge (220) at a second juncture (530) having a second juncture outside angle ($\Theta_{M2}$).

Like $\Theta_{M1}$, $\Theta_{M2}$ is measured from the web outer side (240), i.e. the non-channel side, to the outer side of the second flange (400) as shown in FIG. 4. The value of $\Theta_{M2}$ is preferably greater than 270° and less than 360°. If $\Theta_{M2}$ is less than 270° the stud bridge member will be difficult to rotate onto the walls of the stud hole.

As a corollary there will be an explementary angle $\alpha_{M2}$ which is the measurement of the angle opposing angle $\Theta_{M2}$. $\Theta_{M2}$ plus $\alpha_{M2}$ will equal 360°.

It is preferred that $\Theta_{M1}=\Theta_{M2}$, although not required. Put another way, $\Theta_{M1}$ and $\Theta_{M2}$ have about the same value, or preferably are the same value.

The second juncture forms a second juncture line (540) which is substantially parallel to the longitudinal axis (500).

To define the C shape, or channel, as opposed to a Z, the first flange (300) and the second flange (400) must simultaneously be in a space on the web inner side (260).

Figure 5:
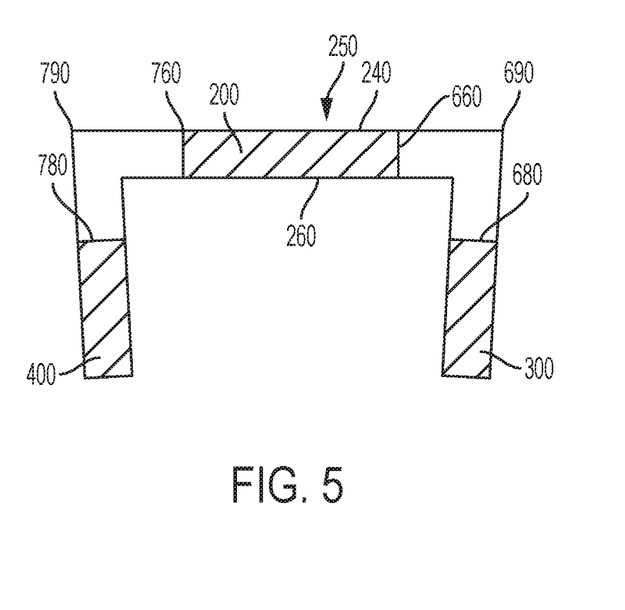
FIG. 5 is a cut-a-way center view at the point noted in FIG. 3A.

FIG. 5 is a cutaway view of the stud bridge member (100). It depicts the first flange (300), the second flange (400), the web (200) having a web outer side (240) and a web inner side (260). The web first notch point (660), the first flange notch point (680) and the first inflection point (690) are also shown. The web second notch point (760), the second flange notch point (780) and the second inflection point (790) are shown as well. One way to make the bridge member is to cut the notches into a flat piece of metal and then fold the flat piece of metal into the web with a flange on each side. This is depicted in FIG. 6A to FIG. 6D. When metal flat, the notch has a distinct shape.

Figure 6A:
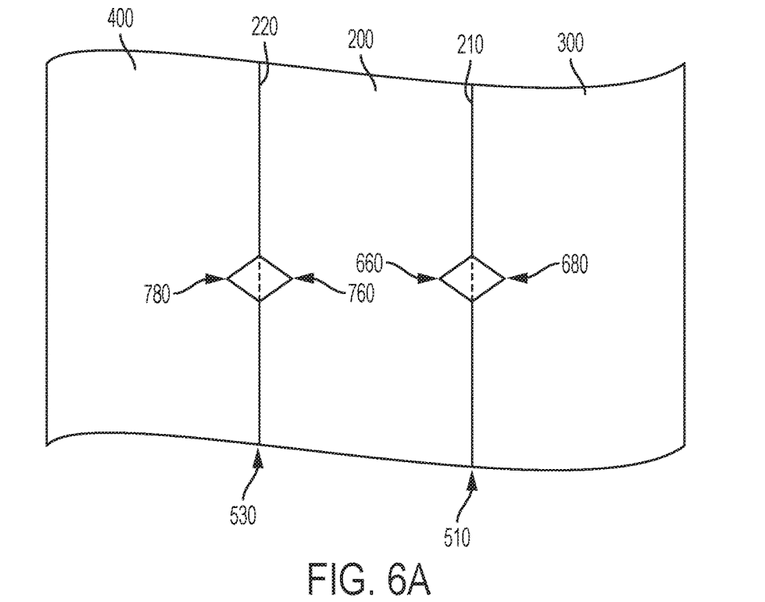
FIG. 6A is an embodiment of the notches of a notch set.
Figure 6B:
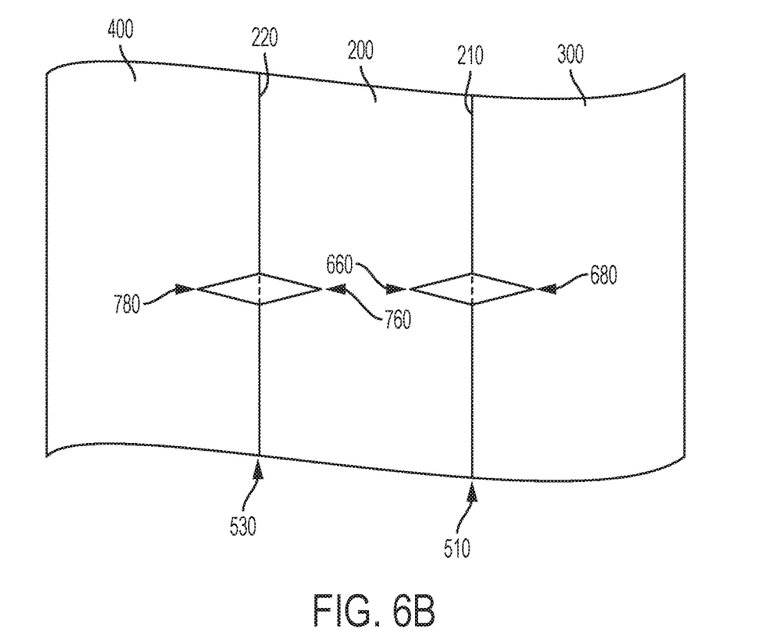
FIG. 6B is a separate embodiment of the notches of a notch set.

One preferred shape is an elongated rectangle, preferably an elongated square. This is depicted in FIG. 6B. The notch shape would appear flat as a diamond with elongated tips at the flange notch points. This elongated flaring from the flange notch point or necking down as the cut approaches the flange notch point, helps improve the engagement of the notch with the stud. This elongated flaring or necking down to a pinch point in the flange also creates a lead-in for the stud member to aid in the assembly process.

FIG. 6A to FIG. 6D show alternative embodiments of the notches in the notch set. These embodiments demonstrate how the part of the notch in the flange has a pinch point, but that the part of the notch in the web should be minimized. To be minimized means that the maximum distance from the cut(s) in the web measured from any point along the cut in the web, perpendicular to the longitudinal axis to the juncture is less than about 10% of the width of the web, preferably less than 5% of the width of the web, with less than 1% of the width of web even more preferred. It is even possible that the notch is not cut into the web at all, but only through the juncture. The notch's radius into the web is preferably large while the notch width and length in the web should be smaller. The notch should be sharp in the flange, but well-rounded in the web In FIG. 6A, the unstretched square oriented as a diamond is shown.

FIG. 6B, shows the stretched rectangle, or stretched diamond. This is a preferable embodiment so that the stud wall can be pinched by the part of the notch in the flange. The notch edge lines do not have to be straight but can be curved as indicated.

Figure 6C:
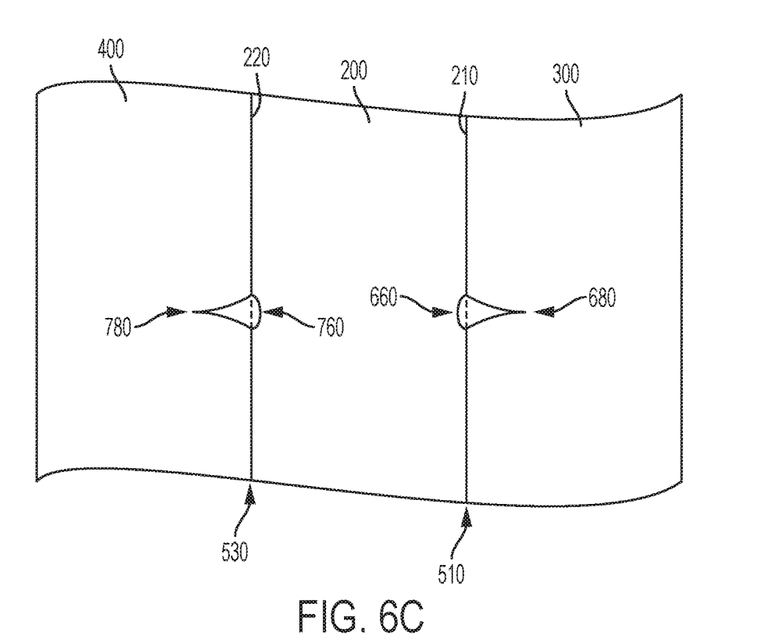
FIG. 6C is a separate embodiment of the notches of a notch set.

In FIG. 6C, the embodiment of substantially forming a triangle is shown with the two sides of the notch tapering to a point in the flange side, and extending past the inflection point, through about the juncture and about, or optionally slightly into the web. While the drawing shows the part of the triangle in the web being a curve, that part of the notch line can be straight, zig-zagged, or two lines, provided that the maximum distance into the web is less than one of the preferred amounts noted above. The lines do not have to be straight but can be curved as indicated. In fact, the web first notch point (660) and web second notch point (760) can be immediately after the juncture at the respective web edge (210 and 220). Again, the notch's radius into the web is preferably large while the notch width and length in the web should be smaller. The notch should preferably be sharp in the flange, but well-rounded in the web.

Figure 6D:
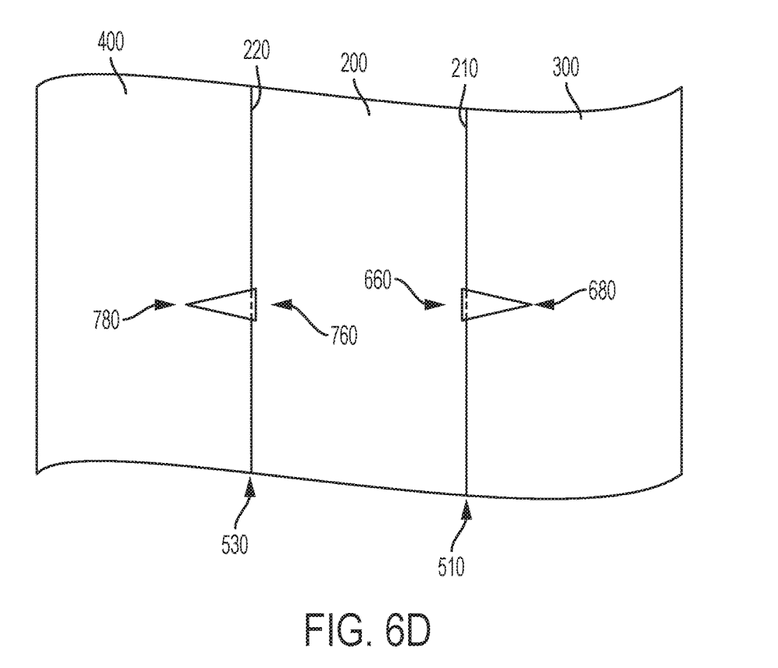
FIG. 6D is a separate embodiment of the notches of a notch set.

FIG. 6D shows the embodiment where the notch cuts through the juncture but does not enter the web. In fact, the web first notch point (660) and web second notch point (760) are in between the juncture and the respective web edge (210 and 220).

We claim:

1. An installation of a stud bridge member (100) and at least a first stud comprising:
    the stud bridge member, and the at least a first stud;
    the stud bridge member comprising:
        a web (200) having a web outer side (240), a web inner side (260), a web first edge (210) and a web second edge (220) defining a web plane (250) having a longitudinal axis (500);
        a first flange (300) and a second flange (400) extending into a space on the web inner side (260); and
        at least one notch set comprising a first notch (600) and a second notch (700),
    with the first flange comprising a first flange first edge (320) and a first flange second edge (340) defining a first flange plane (350) with the first flange first edge joined with the web first edge at a first juncture (510) having a first juncture outside angle ($\Theta_{M1}$) from the web outer side to the first flange, with a corresponding explementary inner angle ($\alpha_{M1}$), with the first juncture forming a first juncture line (520) which is substantially parallel to the longitudinal axis; the second flange (400) comprising a second flange first edge (420) and a second flange second edge (440) defining a second flange plane (450) with the second flange first edge joined with the web second edge at a second juncture (530) having a second juncture outside angle ($\Theta_{M2}$) from the web outer side to the second flange, with a corresponding explementary inner angle ($\alpha_{M2}$), with the second juncture forming a second juncture line (540) which is substantially parallel to the longitudinal axis, with either one of, or both, $\Theta_{M1}$ and $\Theta_{M2}$ having a value of greater than 270° and less than 360°; the first juncture line, the first flange first edge, the first flange second edge, the second juncture line, the second flange first edge, and the second flange second edge being substantially parallel with the longitudinal axis;
    the first notch comprising a first notch length (620), a first notch width (640) measured perpendicular to the first notch length, and a first notch cut plane (630) wherein the first notch length begins in the first flange at a first flange notch point (680) and extends at least through the first juncture and to a web first notch point (660); the second notch comprising a second notch length (720), a second notch width (740) measured perpendicular to the second notch length, and a second notch cut plane (730), wherein the second notch length begins in the second flange (400) at a second flange notch point (780) and extends through at least the second juncture to a web second notch point (760), wherein either one of, or both, the first notch length and the second notch length do not extend completely across the respective first flange and second flange; and
    a line passing from the web first notch point to the web second notch point is perpendicular to the longitudinal axis;
    the first stud comprising a first stud web, a first stud hole passing through the first stud web with the first stud hole having a first stud hole depth and a first stud hole length;
    wherein the bridge member passes through the first stud hole with the first notch and the second notch engaged with the first stud at the first stud hole.

2. The stud bridge member of claim 1, wherein a notch plane defined by the line connecting the first flange notch point to the web first notch point to the web second notch point to the second flange notch point is substantially perpendicular to the longitudinal axis.

3. The stud bridge member of claim 1, wherein the first notch width is substantially perpendicular to and along the first notch length and increases beginning from the first flange notch point to a first notch inflection line (690), and the second notch width is substantially perpendicular to and along the second notch length and increases beginning from the second flange notch point to a second notch inflection line (790).

4. The stud bridge member of claim 3, wherein a notch plane defined by the line connecting the first flange notch point to the web first notch point to the web second notch point to the second flange notch point is substantially perpendicular to the longitudinal axis.

5. The stud bridge member of claim 3, wherein the first notch width decreases beginning from the first notch inflection line to the web first notch point, and the second notch width decreases beginning from the second notch inflection line to the web second notch point.

6. The stud bridge member of claim 5, wherein a notch plane defined by the line connecting the first flange notch point to the web first notch point to the web second notch point to the second flange notch point is substantially perpendicular to the longitudinal axis.

7. The stud bridge member of claim 3, wherein the first notch extends through about the first juncture and the second notch extends through about the second juncture.

8. The stud bridge member of claim 7, wherein a notch plane defined by the line connecting the first flange notch point to the web first notch point to the web second notch point to the second flange notch point is substantially perpendicular to the longitudinal axis.

* * * * *